May 19, 1959 D. R. STRICKLER ET AL 2,886,851
RETREAD MOLD
Filed March 7, 1955 3 Sheets-Sheet 2

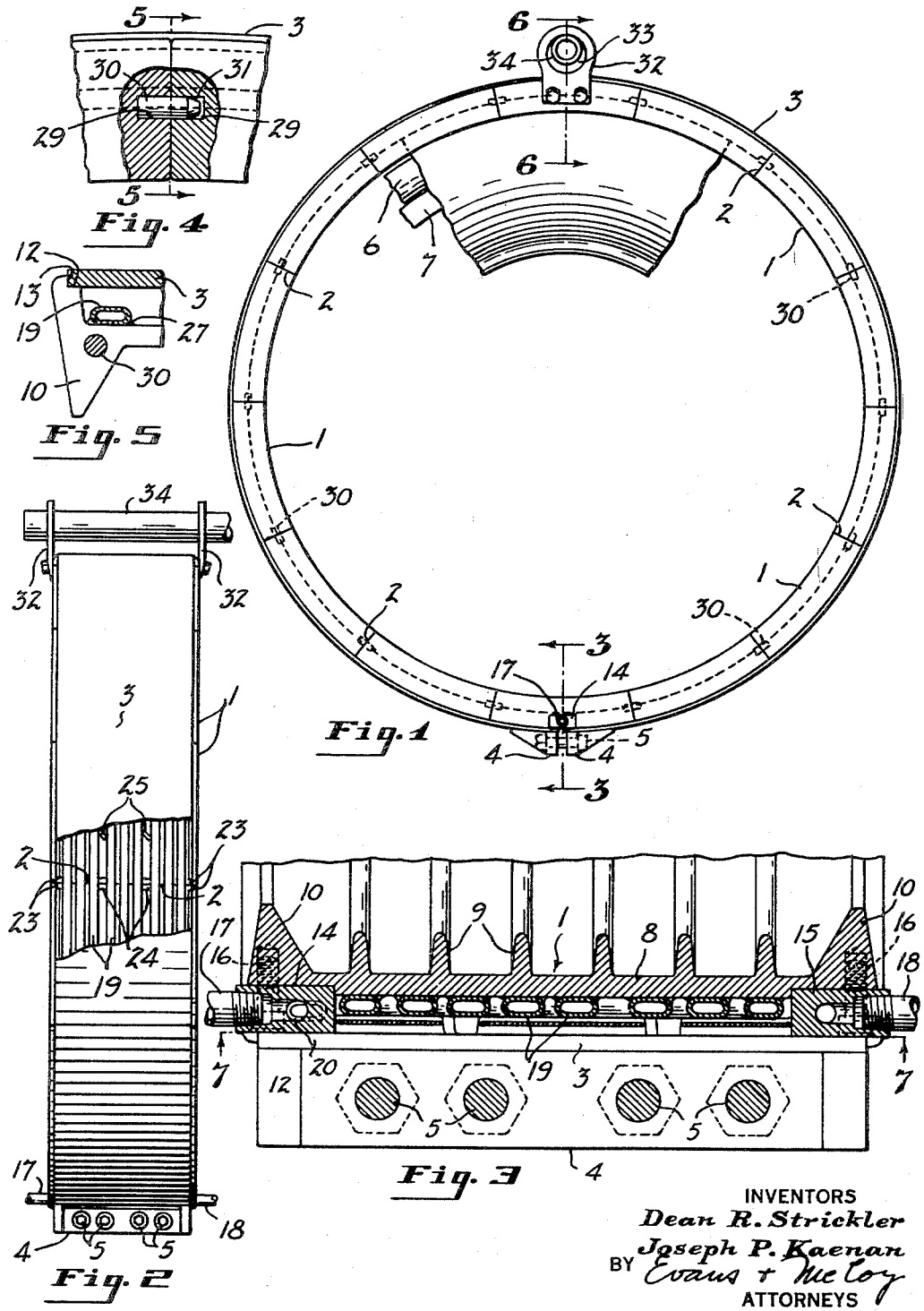

INVENTORS
Dean R. Strickler
Joseph P. Kaenan
BY Evans + McCoy
ATTORNEYS

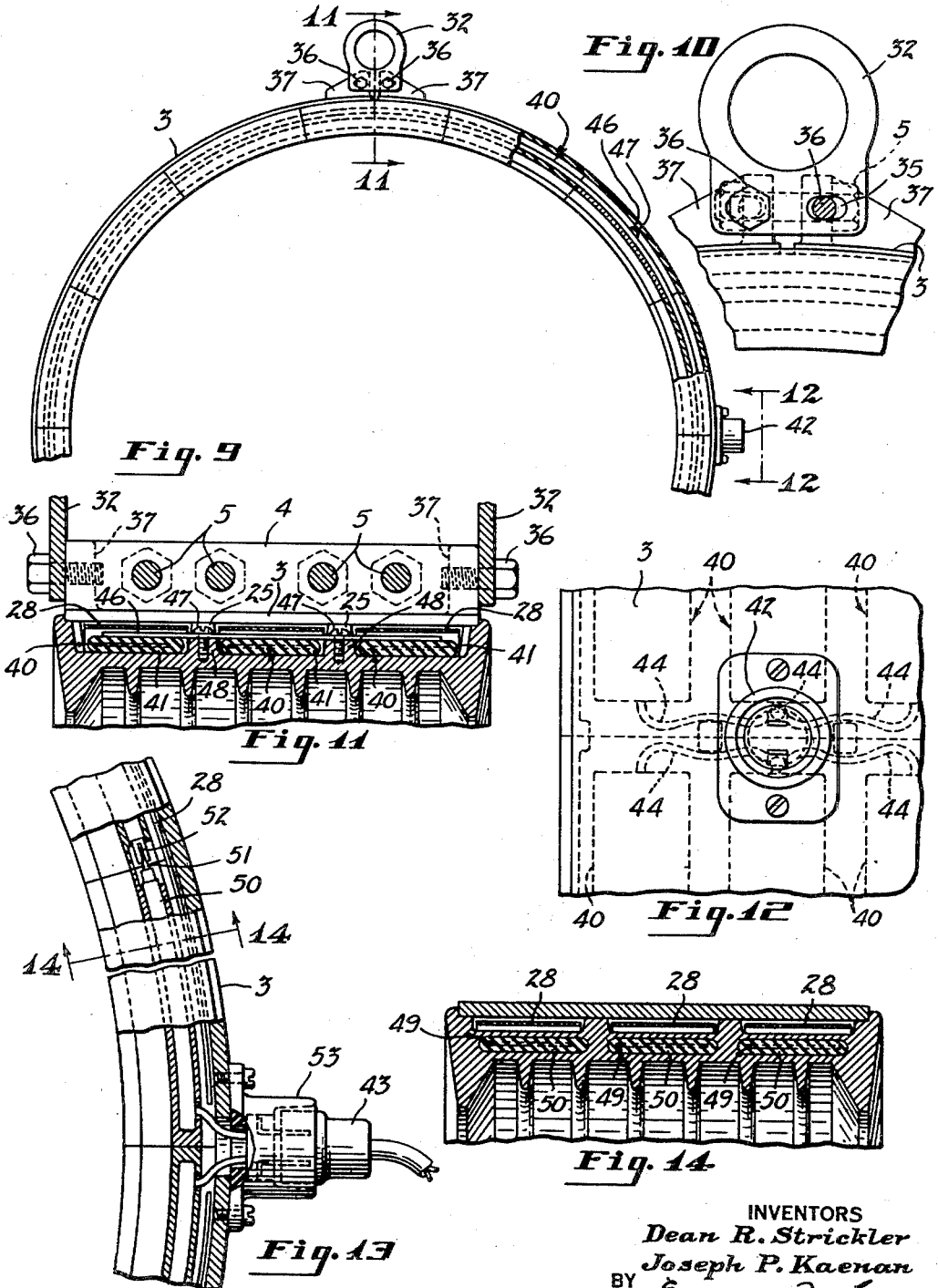

United States Patent Office 2,886,851
Patented May 19, 1959

2,886,851

RETREAD MOLD

Dean R. Strickler, Cuyahoga Falls, and Joseph P. Kaenan, Akron, Ohio, assignors to The General Tire and Rubber Company, Akron, Ohio, a corporation of Ohio Application March 7, 1955, Serial No. 492,387

5 Claims. (Cl. 18—38)

This invention relates to retread molds of the ring type provided with an internal tread receiving recess into which the peripheral portion of a tire casing to which an unvulcanized tread has been applied may be forced by expanding the casing.

The mold of the present invention is in the form of a rigid annulus made up of a series of arcuate sections disposed end to end with their abutting faces disposed radially, the sections being held together in a rigid annulus by means of a contractible clamping band encircling the annulus. The sections are preferably in the form of identical castings composed of a light metal of high heat conductivity such as an aluminum alloy. The sections are profiled internally so that the assembled mold will form a suitable slip resistant tread pattern. Heat is applied to the mold annulus for vulcanizing a tread in the mold, each of the mold sections having a relatively thin web portion to which the heat is applied and heat conducting side edge portions that are thicker than the web and that extend radially inwardly with respect to the web to overlie the side edges of the tread being vulcanized.

The mold sections have external side flanges that are alined circumferentially to provide the mold annulus with circumferentially continuous outwardly projecting peripheral flanges that are engaged by the clamping band which when tightened exerts a radial thrust on the mold sections to secure them together in a rigid annulus and which is spaced by the flanges from the central portions of the mold sections to provide an annular chamber in which suitable heating means may be mounted. The heating means is mounted upon the exterior of the mold sections within the annular chamber between the external side flanges and within the clamping band.

The heating means may be in the form of a steam conduit wound in spaced convolutions around the mold annulus within the annular chamber surrounding the same, or may be in the form of spaced bands or convolutions of electrical heating elements. In either case the end convolutions of the steam conduit or electric heating elements directly overlie the thickened heat conducting edge portions of the mold sections to effectively heat the side edge portions of the tread being vulcanized.

The exterior side flanges of the mold are provided with circumferential seats which receive and take the radial thrust of the sheet metal clamping band that holds the sections together and the flanges form with the clamping band an annular chamber surrounding the mold and enclosing the heating means.

Objects of the invention are to provide a mold of simple and inexpensive construction which is of rigid and durable construction and which is made up of a series of identical castings that can be formed in a single permanent mold, to provide a mold which can be quickly and easily assembled, and to provide a mold composed of arcuate sections held together by a clamping band which forms the exterior wall of a peripheral heating chamber in which the mold heating means is housed.

Reference should be had to the accompanying drawings forming a part of this specification, in which:

Figure 1 is a front elevation of a mold embodying the invention;

Fig. 2 is a side elevation of the mold shown in Fig. 1;

Fig. 3 is a transverse section taken on the line indicated at 3—3 in Fig. 1;

Fig. 4 is a fragmentary side elevation partially broken away to show one of the dowel pins between abutting mold sections;

Fig. 5 is a fragmentary transverse section between the abutting faces of the mold sections;

Fig. 9 is a fragmentary side elevation of a mold of slightly modified design that is provided with electrical heating means;

Fig. 10 is a fragmentary side elevation of the hanger brackets by means of which the mold is supported during the vulcanizing operation;

Fig. 11 is a transverse section taken on the line indicated at 11—11 in Fig. 9;

Fig. 12 is a fragmentary plan view showing the plug and socket connection through which current is supplied to the electrical heating elements;

Fig. 13 is a fragmentary side elevation on an enlarged scale of the portion of the mold having the plug and socket connection, portions of the mold being in section to show the connection between heating elements carried by adjacent mold sections; and Fig. 14 is a transverse section taken on the line indicated at 14—14 in Fig. 13.

Figure 6:
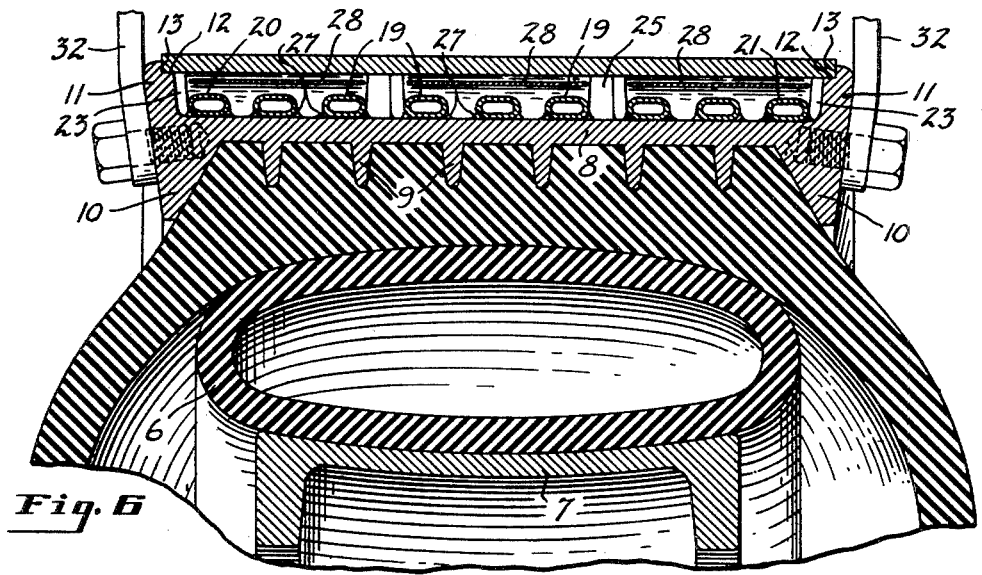
Fig. 6 is a section taken on the line indicated at 6—6 in Fig. 1.

Referring to the accompanying drawings, the retread mold of the present invention is made up of a series of internally recessed arcuate metal sections 1 which are preferably identical castings composed of a light metal of high heat conductivity such as an aluminum alloy and which can be produced by use of a single permanent mold. The sections 1 have abutting radially disposed end faces 2 and are held together by a contractible sheet metal band 3 which may be formed of steel that encircles the sections. The band has flanges 4 attached to the ends thereof and these flanges are connected by bolts 5, by means of which the clamping band 3 may be drawn tightly against the mold sections 1 to hold the sections against relative radial movements and provide a rigid annulus. The sections 1 are formed to provide the mold annulus with an internal tread receiving recess and a tire casing with an unvulcanized tread applied thereto may be expanded by means of an internal inflatable air bag 6 mounted on a rigid supporting annulus 7 as is common practice in the art.

The mold sections 1 each have a web portion 8 that is internally profiled to provide the desired anti-skid pattern on a tire tread vulcanized in the mold. If the tire tread to be vulcanized is transversely flat, the web 8 will be substantially cylindrical as shown in Figs. 3, 6 and 11, but for transversely convex treads the web will be curved transversely as shown at 8a in Fig. 8. As herein shown, the tread design is formed by internal ribs 9 integral with the web portion 8 or 8a. The mold sections are provided with side edges portions 10 which are thicker than the web portion 8 and which project radially inwardly from the web portion. The edge portions 10 are in the form of inwardly tapering flanges that conform to the inwardly flaring shoulders of the tire tread being vulcanized, the side portions 10a in Fig. 8 being also relatively thick, inwardly tapering and shaped to conform to the edge portions of a transversely curved tread. The mold sections have outwardly extending side flanges 11 which are alined circumferentially of the mold to provide the mold with circumferentially continuous peripheral flanges. The side flanges 11a shown in Fig. 8 of the drawings differ from the flanges 11 shown in Figs. 1 to 6, 11 and 14 only in that they are of somewhat greater height to bring the outer peripheries thereof radially outwardly of the periphery of the central portion of the web 8a. The side flanges 11 are provided with cylindrical seats 12 upon which the side edges of the sheet metal band 3 are seated, the flanges being rabbeted to provide retaining shoulders 13 which engage with the side edges of the band 3 to hold the sections against relative lateral movements with respect to the band.

Figure 7:
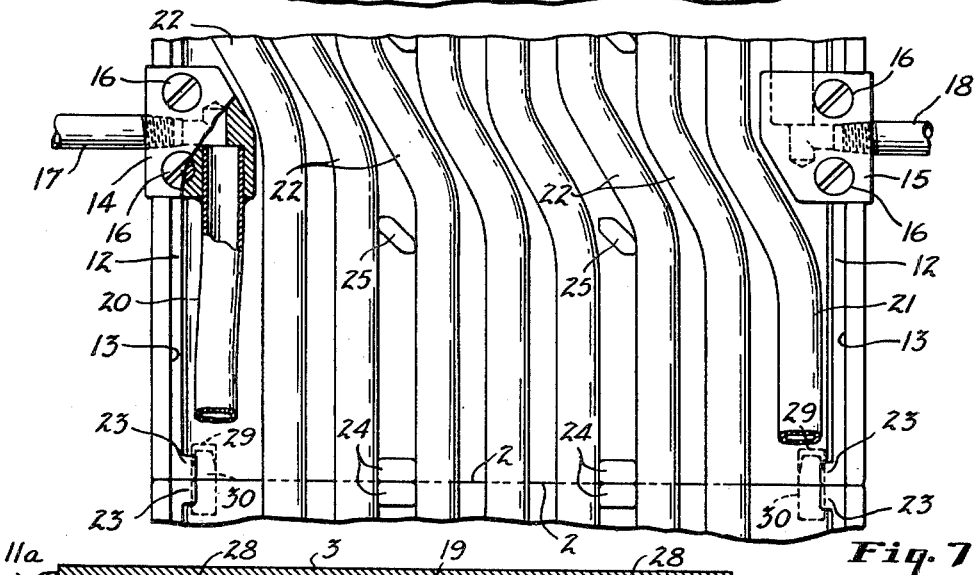
Fig. 7 is a fragmentary plan view of a portion of the exterior mold annulus to which the steam fittings are attached, the view being taken as indicated at 7—7 in Fig. 3.

As shown in Figs. 1, 3 and 6, steam fittings 14 and 15 are attached to the exterior of one of the mold sections. The fittings 14 and 15 are preferably transversely alined and are positioned in openings in the opposite side flanges 11 of the section. The fittings 14 and 15 are attached to the mold section by means of screws 16 extending into the thickened portions 10 thereof. Pipes 17 and 18 are attached to the fittings 14 and 15 and one of these pipes may serve as an inlet for stream under pressure and the other for a discharge outlet. A steam conduit 19 is wrapped around the annulus formed by the sections 1 in a series of convolutions, the ends of the conduit being attached to the fittings 14 and 15. The conduit 19 contacts with the exterior of the mold annulus throughout its circumference between the flanges 11, and the end convolutions of the conduit 19 directly overlie the thickened side portions 10 of the mold sections. End convolutions 20 and 21 of the conduit 19 extend substantially throughout the circumference of the mold closely adjacent and parallel to the side flanges 11 and the convolutions of the conduit within the end convolutions 20 and 21 are disposed parallel to the end convolutions, the portions of the conduit lying between the fittings 14 and 15 having bent portions 22 which connect adjacent convolutions as shown in Fig. 7.

The mold sections are each provided at the opposite ends thereof with rigid thrust transmitting bracing members in the form of laterally spaced outwardly projecting positioning lugs 23 and 24 that have outer end faces flush with the shoulders 12 for engagement with the interior face of the band 3 at laterally spaced points between the side edges thereof to apply radial thrusts uniformly to the interior of the band. The lugs 23 are integral with and project inwardly from the side flanges 11 and space the conduits 20 and 21 from the side flanges and the lugs 24 are positioned between intermediate convolutions of the conduit 19. Each of the mold sections is provided with a plurality of band engaging and coil positioning lugs 25 in circumferential alinement with the lugs 24, the lugs 25 being regularly spaced circumferentially and being in the form of relatively thin diagonally positioned ribs which contact with the interior of the clamping band 3, but which are of relatively small cross sectional area to avoid excessive loss of heat by conduction through the ribs to the clamping band 3.

Figure 8:
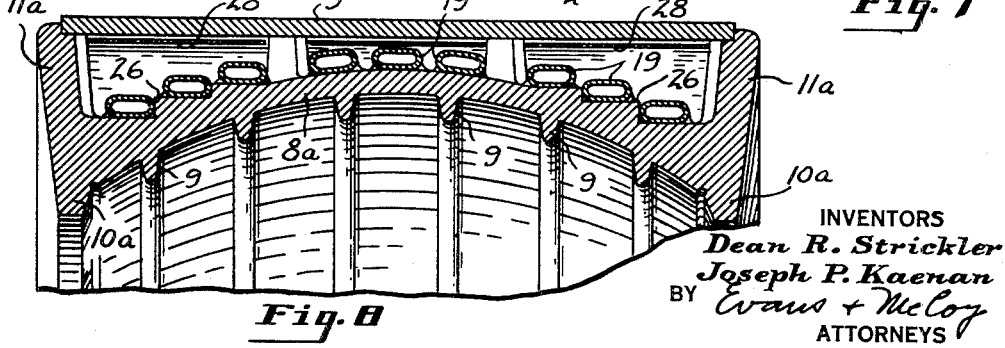
Fig. 8 is a transverse section through a mold shaped to accommodate a transversely rounded tread.

The mold shown in Fig. 8 differs from the mold shown in Figs. 1 to 6 only in the difference in the form of the sections necessary to make them conform to a transversely convex tire tread. To facilitate the positioning of the steam conduit 19 on the curved web 8a, the external surface of the web may be provided with stepped portions 26 that provide circumferential recesses in which the individual convolutions of the conduit are received.

The steam conduit 19 may be secured to the mold sections by means of a suitable solder 27 of high conductivity. In order to lessen loss of heat through the sheet metal band 3 forming the exterior wall of the heating chamber, strips 28 of heat radiating material such as aluminum foil may be interposed between the convolutions of the steam conduit 19 and the band 3.

To retain the mold sections 1 in proper alinement while the steam conduit 19 is being wound around the annulus and attached thereto, means is provided for positively locking the abutting ends of the sections against relative radial movements. As shown in Figs. 4 and 7, the ends of the thickened side portions 10 of the mold sections are provided with drilled sockets 29 which aline axially when the sections are assembled. A dowel pin 30 has a press fit in the socket 29 of one section and has a tapered end 31 that engages in the alined socket 29 of the abutting mold section. As shown in Fig. 7, the dowel pins 30 are attached to one mold section and engage in the sockets 29 of the abutting mold section, each mold section having two dowels attached to one end and two dowel receiving sockets at its opposite end.

Hanger brackets 32 attached to opposite sides of the mold are provided with alined apertures 33 that receive a hanger bar 34 from which the mold is suspended during the vulcanizing operation, the brackets 32 permitting the mold to be reversed on the hanger.

The hangers 32 may be bolted to opposite sides of a mold section as shown in Fig. 1 or may be bolted to the end flanges 4 of the clamping band 3 as shown in Fig. 10, in which case the brackets are provided with slots 35 to receive bolts 36 that attach the brackets to bracing webs 37 at the ends of the flanges 4, the slots 35 permitting the tightening of the band by means of the bolts 5.

Figs. 9 to 12 show the mold equipped with electrical heating means which may be used instead of the steam heating coil shown in Figs. 1 to 6. The heating means is in the form of a plurality of convolutions or bands 40 of electrical heating elements of the resistance type each of which is enclosed in a suitable heat resistant insulating sheath 41. As illustrated three heating bands are provided which are positioned by the lugs 24 and 25. The conductors 40 are of a length to extend around the mold periphery and have their ends connected to the conductor terminals of a socket 42 that is adapted to receive an extension cord plug such as the plug 43 shown in Fig. 13 to supply current to the resistance elements. As shown in Fig. 12, the terminals of the socket 42 may be connected to the resistance elements of the heating bands by conductors 44. The heater bands 40 may be held in place against the exterior surfaces of the mold sections by means of spaced transversely disposed bars 46 that are attached by means of screws 47 to short lugs 48 intermediate the lugs 23 and 24 of the mold sections, the bars 46 engaging the sheaths 41 to hold the heating elements in place.

Figs. 13 and 14 show a modified structure in which the resistance heating elements are permanently embedded in the mold sections. In this modification the mold sections 1a are cast around resistance heating elements 49 that are enclosed in refractory non-conductive sheaths 50. The resistance elements of each mold section have terminal portions 51 and 52 projecting past the ends of the mold section which interengage to provide an electrical connection between the resistance elements of adjacent sections.

A socket 53 is mounted over an opening 54 in the clamping band 3 that is located over the adjoining ends of two mold sections and terminal connections 55 between the socket 53 and the adjacent ends of the heating elements 49 provide for passage of current supplied through the extension cord plug 43 and the resistance elements 49.

The mold of the present invention is of relatively light weight, requires but little space for storage and can be quickly and easily placed in position for the vulcanizing operation after a tire to be retreaded has been mounted therein.

It is to be understood that in accordance with the pro-

What we claim is:

1. A retread mold comprising a tread molding annulus consisting of a series of arcuate cast metal sections, each having an arcuate web and a radially inwardly and a radially outwardly projecting flange integral with and extending along the full length of each side edge thereof, said sections having end faces that abut throughout the width of the annulus to provide a circumferentially continuous internal tread receiving channel and a circumferentially continuous external channel, said outwardly projecting flanges having edge portions that provide cylindrical seats, a flexible sheet metal clamping band encircling said annulus, bridging the space between said external flanges and engaging said seats to provide an annular chamber surrounding and extending substantially the full width of said tread receiving channel, means for contracting said band on said seats to clamp the sections in close end to end engagement, heating bands encircling said tread receiving channel within said annular chamber, and rigid thrust transmitting bracing members interposed between the interior of said clamping band and portions of the web of each section that are spaced inwardly from the external side flanges.

2. A retread mold according to claim 1 in which the bracing members are in the form of lugs integral with the webs of the cast metal sections and are arranged between heating bands in laterally spaced circumferential rows.

3. A retread mold according to claim 1 in which all abutting ends of the cast metal sections are provided with interfitting dowels and sockets, the abutting ends being provided adjacent each side edge of the mold, one with a socket opening to its abutting face and the other with a dowel projecting from its abutting face and fitting in the socket.

4. A retread mold according to claim 1 in which the heating bands are in the form of steam coils and in which the external faces of the webs are formed with circumferentially extending recesses in which individual steam coils are positioned.

5. A retread mold comprising a tread molding annulus consisting of a series of arcuate cast metal sections, each having an arcuate web and a radially inwardly and a radially outwardly projecting flange integral with and extending along the full length of each side edge thereof, said sections having end faces that abut throughout the width of the annulus to provide a circumferentially continuous internal tread receiving channel and a circumferentially continuous external channel, said outwardly projecting flanges having rabbeted edge portions forming annular seats spaced outwardly from said web and an annular shoulder at the outer side of each seat, a flexible sheet metal clamping band between said annular shoulders and encircling said annulus to provide an annular chamber, means for contracting said band on said seats to clamp said sections in close end to end engagement, heating bands encircling the mold and positioned in said external chamber, and laterally spaced circumferential rows of stiffening lugs spaced inwardly from said external flanges and interposed between the webs of said sections and the interior of said clamping band.

References Cited in the file of this patent

UNITED STATES PATENTS

| 1,368,268 | Legnard | Feb. 15, 1921 |
| 2,372,216 | MacMillan | Mar. 27, 1945 |
| 2,372,217 | MacMillan | Mar. 27, 1945 |
| 2,440,321 | Bacon | Apr. 27, 1948 |
| 2,651,078 | Hawkinson | Sept. 8, 1953 |

FOREIGN PATENTS

| 66,830 | Netherlands | Oct. 15, 1948 |